I. P. CARPENTER.
AUTOMOBILE LOCK.
APPLICATION FILED APR. 21, 1919.

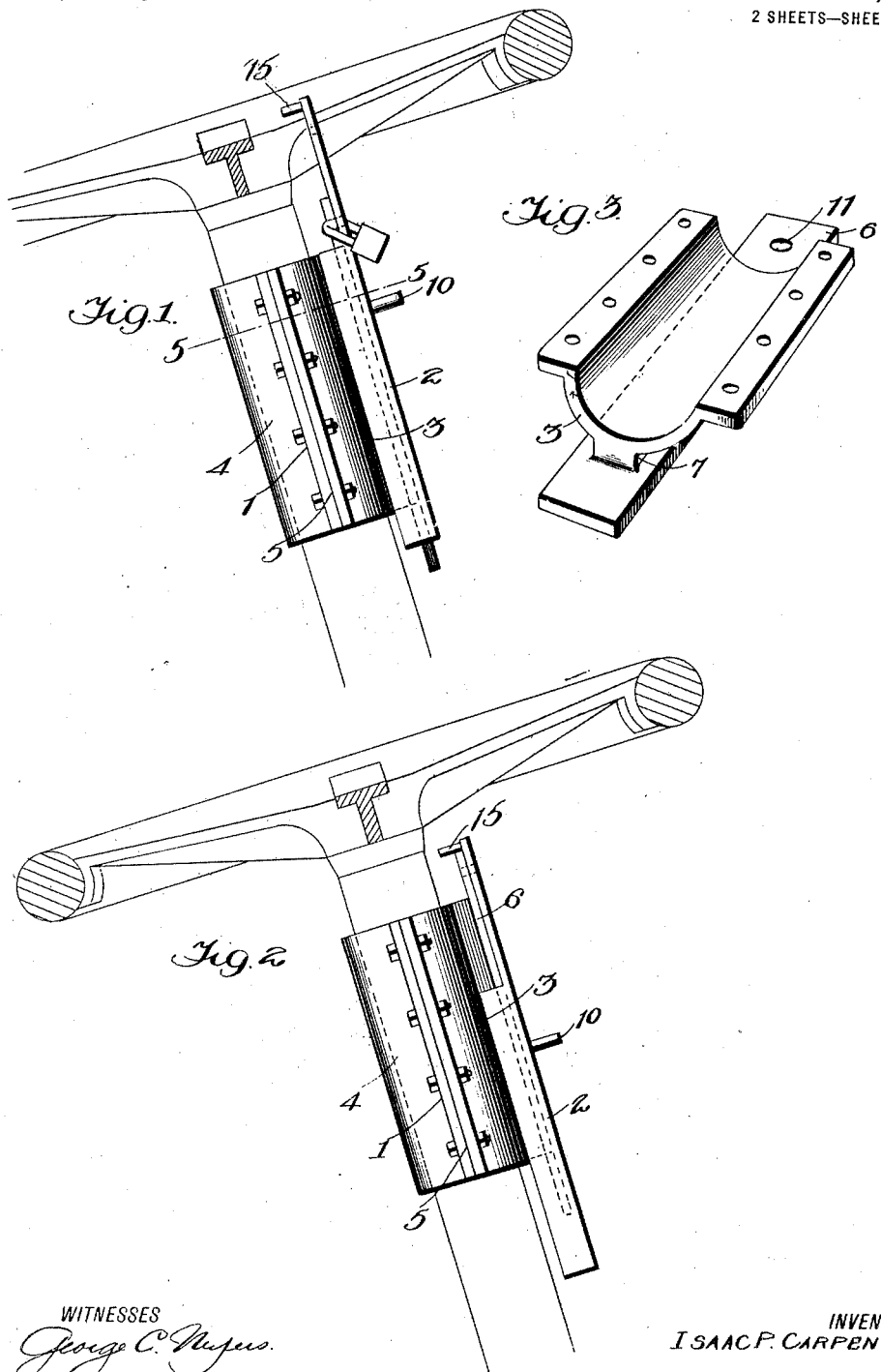

1,334,987.

Patented Mar. 30, 1920.
2 SHEETS—SHEET 2.

WITNESSES
George C. Myers

INVENTOR
ISAAC P. CARPENTER,
BY
ATTORNEYS

UNITED STATES PATENT OFFICE.

ISAAC PARKER CARPENTER, OF WALTHAM, MASSACHUSETTS.

AUTOMOBILE-LOCK.

1,334,987.   Specification of Letters Patent.   Patented Mar. 30, 1920.

Application filed April 21, 1919. Serial No. 291,639.

*To all whom it may concern:*

Be it known that I, ISAAC P. CARPENTER, a citizen of the United States, and a resident of Waltham, in the county of Middlesex and State of Massachusetts, have invented a new and useful Improvement in Automobile-Locks, of which the following is a specification.

This invention relates to an improvement in automobile locks, of the type in which the steering wheel is held against turning by unauthorized persons, during the absence of the owner or driver of the automobile.

One of the principal objects of the invention is to provide a lock of this general type in the nature of a tongue adjustably carried on the steering column, and movable into position between any two adjacent spokes of the steering wheel for presenting an obstruction to prevent turning the wheel, an advantage over other locks of this general nature, which use means for positively engaging one of the spokes of the steering wheel residing in the fact that with my lock it is not necessary to have the steering wheel adjusted in order to be locked to a position where one of the spokes of the steering wheel will be positively engaged by the lock, considerable latitude, respecting the position of the steering wheel relatively to the lock being allowed, by reason of the fact that so long as the tongue of my lock projects between any two spokes of the wheel, the latter will be held against turning through any considerable angle.

Another object of my invention aims at the provision of a steering wheel lock which will be exceedingly strong, simple, durable, and inexpensive to manufacture.

With these and other objects in view which will become apparent as the description proceeds, the invention resides in the construction, combination, and arrangement of parts hereinafter more fully described, and claimed, and illustrated in the accompanying drawings, in which like characters of reference indicate like parts throughout the figures, of which—

Figure 1 represents an elevational view of a lock, constructed according to my invention, showing the lock in position to prevent the steering wheel from being turned.

Fig. 2 represents a similar view, showing the lock in lowered position.

Fig. 3 represents a view in perspective of the member of the clamp or supports on which the guide plate for the sliding tongue is carried.

Figure 4:
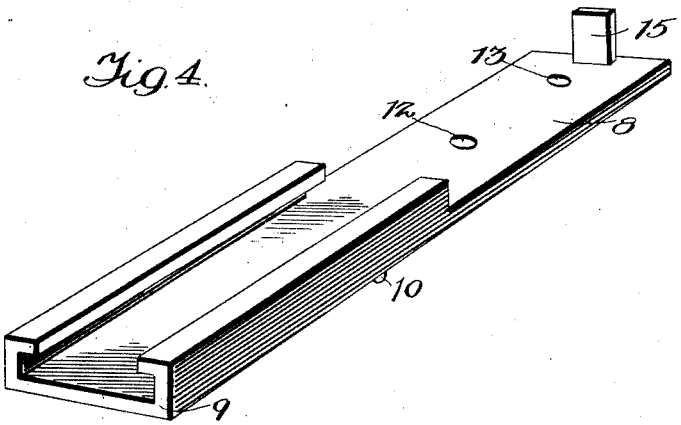
Fig. 4 represents the perspective view of the sliding tongue.
Figure 5:
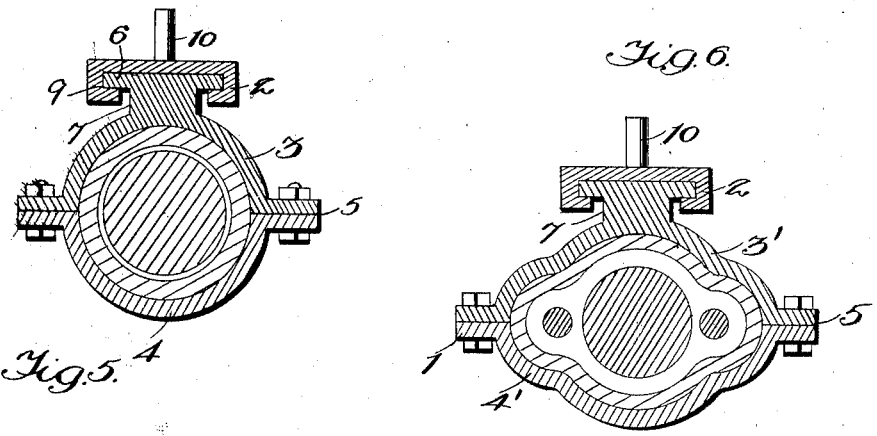
Fig. 5 represents a sectional view taken on the line 5—5, Fig. 1.

Referring more particularly to the drawings, the lock includes a supporting member, indicated generally at 1, on which a sliding tongue, indicated generally at 2, is mounted, the support 1 being adapted to be clamped to the steering post of the automobile, in such a position that the tongue can be moved up to project between the spokes of the steering wheel when the latter is to be locked in position.

The supporting member of the device is made in two sections, indicated respectively at 3 and 4. Each of these sections is generally semi-cylindrical in cross section, whereby to fit about the steering column, and said sections are provided with abutting laterally extending flanges indicated at 5, secured tightly together by means of bolts or other fastening means. These bolts or fastening means are drawn tight whereby to clamp the support in position on the steering column.

The member 3 of the support includes a guide plate 6, which is rectangular in shape and which is of a much greater length than width. This guide plate 6 is attached to the member 3 of the support through the medium of a web 7, the web being of less width than the plate, whereby to leave the edges of the guide plate free in order to form guiding rails for the sliding tongue member 2. The guide plate 6 extends at its ends beyond the ends of the member 3 of the support, and which guide-plate, web 7, and support member 3 are preferably made of one solid piece of metal.

The sliding tongue 8 is mounted to slide up and down on the guide plate 6, and, in order to be properly guided in its movement of said plate, is provided at its lower ends with L-shaped flanges 9, which slidably fit over the edges of the guide plate and limit the movement of the sliding tongue to a longitudinal movement relatively to the plate 6. The tongue member is provided with a knob or handle 10, whereby it may be readily raised or lowered by the driver of the car. Projecting inwardly from the upper end of the tongue is a lug or stop 15, which limits the downward movement of the tongue by abutting against the upper edge of the guide plate and thus prevents accidental loss of the tongue from the plate. In assembling the tongue and plate, the tongue may be slipped over the plate, the lower end of the tongue being engaged over the upper end of the plate and the tongue then slipped down into normal position.

The portion of the guide plate 6, projecting above the support member 3, is provided with an opening 11, and when the sliding tongue is raised into position to lock the steering wheel against turning, an opening 12 provided in said tongue is brought into registration with the opening 11. A padlock or other suitable locking device may then be passed through the registering openings 11 and 12, and the sliding tongue would then be locked in raised position. When in this position the upper end of the tongue will project between the spokes of the steering wheel, presenting an effective obstruction which will prevent turning of the wheel through any considerable angle until the padlock or locking device has been removed and the tongue lowered to its normal position.

When the tongue is in lowered position an opening 13 provided in said tongue registers with the opening 11 in plate 6, and the padlock or other locking device may be passed through the registering openings for locking the tongue in lowered position.

Figure 6:
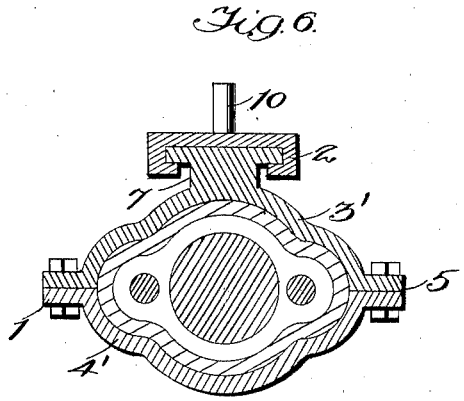
Fig. 6 represents a view similar to Fig. 5 showing the modification of the invention particularly applicable to Ford cars.

In Fig. 6 I have shown the form of the invention adapted particularly for use on Ford cars, the modification differing from the original type by reason of the fact that the members 3' and 4' instead of being semi-cylindrical in shape are relatively U-shaped in cross section, whereby to snugly fit the steering post of a Ford automobile. In this connection, it may be stated that the cross sectional form of the supporting member may be varied in accordance with the cross sectional form of the steering post to which the members are to be clamped.

The operation of the invention may be briefly described as follows. While driving the tongue is in lowered position, indicated in Fig. 2, when a stop is made and it is desired to lock the car against theft, the padlock or other locking device is removed from the tongue, the latter moved upwardly by engaging the handle or knob 10, shifting the tongue being raised until the opening 12 of the tongue registers with the opening 11 in the guide plate. The padlock is then passed through the openings and locked. The tongue in this position will project at its upper end between the spokes of the steering wheel and will hold this wheel against turning. It will be noticed that it is not necessary to have the steering wheel in any particular or exact position with respect to the locking device, it being merely necessary to have clearance enough to allow the tongue to be moved into position between any two adjacent spokes of the steering wheel. This arrangement while allowing considerable latitude with respect to the position of the spokes of the wheel relatively to the lock, at the same time prevents movement of the wheel through any considerable or great angle.

The device is exceedingly strong, and in this connection it is noteworthy that the relative great length of the guide plate and the guide flanges 9 of the sliding tongue, will resist any tendency of the tongue to twist laterally with respect to the plate, should extraordinary attempt be made to turn the steering wheel when the tongue is in raised position, and hence there will be no danger of the tongue being either twisted entirely off of the plate or its being twisted sufficiently to bind against the plate.

I claim:—

1. A steering wheel lock comprising a supporting member adapted for clamping engagement upon the steering post of an automobile, a flat elongated guide plate on said member and extending beyond the ends thereof, the upper projecting end being provided with a hole, a tongue slidable longitudinally on said plate and having side flanges embracingly engaging the edges thereof, said tongue being adapted to be moved into engagement between the spokes of the steering wheel and being provided with a hole adapted to register with said first named hole when said tongue is thus moved, the registered holes being adapted to receive the shackle of a padlock.

2. A steering wheel lock for automobiles comprising a supporting member made of two sections adapted to be clamped upon the steering post of an automobile, a guide plate, a web connecting the guide plate with one of the sections of the support, said guide plate being of a width greater than the width of the web, whereby the edges of the guide plate are left free, a tongue slidably mounted on the guide plate and having the lower portion of its edges inturned to form flanges engaging the edges of the guide plate, the upper portion of the edges of the tongue being free, means carried by the tongue for engaging the plate to limit downward movement of the tongue relatively to the plate, said guide plate being provided with an opening and said tongue being provided with spaced openings one of which is adapted to register with the opening of the guide plate when the tongue is in raised or lowered position relatively to the guide plate whereby a locking device may be engaged with the tongue and guide plate for locking the tongue in raised or lowered position.

ISAAC PARKER CARPENTER.